United States Patent Office 3,839,372
Patented Oct. 1, 1974

3,839,372
MANUFACTURE OF HIGHLY OXYALKYLATED POLYAMIDES
Kurt Schneider, Limburgerhof, Germany, assignor to Badische Anilin- & Soda-Fabrik Aktiengesellschaft, Ludwigshafen (Rhine), Germany
No Drawing. Filed June 3, 1971, Ser. No. 149,781
Int. Cl. C07c *103/30*
U.S. Cl. 260—404.5                                    1 Claim

ABSTRACT OF THE DISCLOSURE

Manufacture of highly oxyalkylated synthetic polyamides by reacting less highly oxyalkylated synthetic polyamides with 1,2-alkylene oxides. Highly oxyalkylated synthetic polyamides are suitable for rendering shaped articles antistatic.

---

This invention relates to a process for the manufacture of highly oxyalkylated polyamides by reacting less highly oxyalkylated polyamides with 1,2-alkylene oxides of from 2 to 4 carbon atoms at elevated temperatures in the presence of an organic liquid. The invention also relates to the products obtained.

It is known from German Pats. 907,701 and 913,957 to react synthetic polyamides with an excess of 1,2-alkylene oxides to form oxyalkylated products, which method involves the reaction of particulate polyamide in an autoclave at temperatures of from 130° to 140° C. by direct pressurization with ethylene oxide or the reaction of the polyamide in the presence of a solvent or volatile swelling agent for the polyamide such as dioxane, tetrahydrofuran or acetone. However, these prior art processes present heat removal problems and are thus restricted to small reactors and give rise to variations in the quality of the product due to local overheating. Moreover, these processes generally require the use of expensive stirrers of special types and it is usually not possible to discharge the reaction product from the autoclave without resorting to special aids. Furthermore, the use of undiluted ethylene oxide as described in Example 2 of German Pat. 913,957 is hazardous, because steep temperature rises may occur due to spontaneous reaction.

It is also known (see Belgian Pat. 740,577) to prepare oxyalkylated polyamides by reacting a synthetic polyamide with from 2.5 to 10 times its weight of 1,2-alkylene oxides of from 2 to 4 carbon atoms in the presence of an aliphatic and/or cycloaliphatic hydrocarbon which is an inert liquid under the conditions of the reaction and is not a solvent or swelling agent for the polyamide or the resulting oxyalkylated polyamide, at temperatures of from 60° to 150° C. at atmospheric or superatmospheric pressure and in the absence of usual reaction catalysts.

However, these processes do not produce highly oxyalkylated polyamides but provide polyamides which contain approximately 4 to 5 times their weight of combined alkylene oxide.

It is an object of the invention to provide highly oxyalkylated polyamides of good color by a method avoiding the aforementioned drawbacks. This object is achieved by the invention.

The process of the invention comprises reacting low-degree oxyalkylated polyamides, which contain at least 50% by weight of combined 1,2-alkylene oxides, with at least 10 times their weight of 1,2-alkylene oxides of from 2 to 4 carbon atoms in the presence of an aliphatic and/or cycloaliphatic hydrocarbon, which is an inert liquid under the conditions of the reaction and has no solvent or swelling action on the oxyalkylated polyamides, at temperatures of from 60° to 150° C. and at atmospheric or superatmospheric pressure in the presence of usual catalysts.

Suitable 1,2-alkylene oxides which may be used in amounts of from 10 to 100 times and preferably from 20 to 50 times the weight of the low-degree oxyalkylated polyamide reactant are, in particular, 1,2-alkylene oxides of from 2 to 4 carbon atoms, such as ethylene oxide, 1,2-propylene oxide or 1,2-butylene oxide. The monomeric 1,2-alkylene oxide must be soluble in the hydrocarbon(s) used as reaction medium. I prefer to use ethylene oxide and/or propylene oxide.

Aliphatic and/or cycloaliphatic hydrocarbons suitable for use in large quantities during the reaction are hydrocarbons which are liquids under the conditions of the reaction and have no solvent or swelling action on the polyamide reactant and no solvent action on the oxyalkylated polyamide product. They must, however, be solvents for the monomeric 1,2-alkylene oxides used. Particularly suitable hydrocarbons are those of from 4 to 12 and especially from 5 to 8 carbon atoms, of which aliphatic saturated hydrocarbons such as butane, pentane and, in particular, heptane are preferred. The amount of hydrocarbon used during the reaction is advantageously such that the hydrocarbon completely covers the oxyalkylated polyamide at all times, including during stirring of the reaction mixture. For example, the reaction of 160 kg. of polyacprolactam has been successfully carried using from 320 to 480 liters of hydrocarbons.

Suitable catalysts for the reaction between the low-degree oxyalkylated polyamides and the 1,2-alkylene oxides are those normally used for the polymerization of 1,2-alkylene oxides (see "Methoden der organischen Chemie," Houben-Weyl, Stuttgart 1963, Vol. 14/II, pp. 427 et seq.). Specifically, suitable catalysts are basic catalysts such as alkali metal hydroxides, for example lithium, sodium and potassium hydroxides, and alkali metal alkoxides, e.g. sodium methoxide and potassium t-butoxide.

Suitable low-degree oxyalkylated polyamides are those which have been prepared by reacting 1,2-alkylene oxide with a synthetic linear polyamide having recurring amide groups in the backbone and which contain at least 50% and advantageously 80% by weight of chemically combined 1,2-alkylene oxide. It is an advantage to use polyamides which are substantially free from non-oxyalkylated polyamide portions.

The low-degree oxyalkylated polyamides may be prepared by known methods, for example by the method described in Belgian Pat. 665,018 in which 1,2-alkylene oxides such as ethylene oxide and/or 1,2-propylene oxide are reacted with synthetic linear polyamides under pressure and at elevated temperatures, in particular temperatures of from 60° to 120° C. and preferably from 80° to 100° C. This reaction may take place in the presence or absence of organic solvents and/or reducing or oxidizing agents, the weight of alkylene oxide present being preferably from 0.5 to 4 times the weight of the polyamide used.

Alternatively, they may be advantageously prepared by the method described in Belgian Pat. 740,577 which involves the reaction of a synthetic polyamide with from 2.5 to 10 times its weight of 1,2-alkylene oxides of from 2 to 4 carbon atoms in the presence of an aliphatic and/or cycloaliphatic hydrocarbon which is an inert liquid under the conditions of the reaction and has no solvent or swelling action on the polyamide or the oxyalkylated polyamide product, at temperatures of from 60° to 150° C. and at atmospheric or superatmospheric pressure in the absence of the usual oxyalkylated catalysts.

The reaction of the 1,2-alkylene oxides with the synthetic linear polyamides takes place on the NH groups of the polyamides to form chemically combined poly(alkylene oxide) chains. The said oxyalkylated polyamides may be referred to as graft polymers.

Advantageously, the low-degree oxyalkylated polyamides prepared by the prior art processes are converted to highly oxyalkylated polyamides by the method of the invention after the addition of the usual catalysts and, if necessary, of hydrocarbons.

The polyamides used for the preparation of the low-degree oxyalkylated polyamides may be the commercially available synthetic linear polyamides having recurring —CO—NH— groups in the backbone. Unless special properties are required in the resulting reaction product, the said polyamides should contain preferably no, or at least only very small quantities of, groups capable of reacting with the 1,2-alkylene oxide, other than the amide groups.

Suitable polyamides may be prepared, for example, by conventional polycondensation of the following polyamide-forming starting materials in the presence of neutral or acid catalysts: mixtures or salts of diamines of from 2 to 12 carbon atoms, such as pentamethylene diamine, hexamethylene diamine and decamethylene diamine, and dicarboxylic acids of from 4 to 12 carbon atoms, such as adipic acid, pimelic acid, sebacic acid and their homologs, terephthalic acid, phenylene diacetic acid and phenylene dipropionic acid, in which the carbon chain may be interrupted by hetero atoms such as oxygen or sulfur. Other suitable polyamide-forming starting materials are polyamide-forming ω-aminocarboxylic acids of from 4 to 12 carbon atoms, which may be substituted by alkyl groups, such as ω-aminobutyric acid, ω-aminocaproic acid, ω-aminocaprylic acid, ω-aminocapric acid, ω-aminodecanoic acid, ω-aminododecanoic acid, the lactams corresponding to said ω-aminocarboxylic acids and mixtures of the said polyamide-forming starting materials. Preferred polyamides are polycaprolactam and polyhexamethyleneadipamide.

In the process of the invention the reaction temperatures are from about 60° to 150° C. and especially from 60° to 120° C. Preferred reaction temperatures from 80° to 120° C. and in particular from 90° to 120° C.

The process of the invention may be carried out at atmospheric pressure or at superatmospheric pressure, conveniently at from 2 to 20 atmospheres and in particular from 5 to 15 atmospheres gauge. In general, the total reaction time is less than about 15 hours, particularly from about 6 to 12 hours.

It is particularly advantageous to carry out the reaction employing evaporative cooling.

The highly oxyalkylated polyamides thus obtained contain chemically combined 1,2-alkylene oxide in an amount which is generally at least 10 times, in particular from 10 to 50 times and advantageously from 15 to 30 times, the amount of polyamide present, by weight. It is possible to attach even greater amounts of alkylene oxide if desired. The resulting highly oxyalkylated polyamides are notable for their excellent quality. They are pure white and have a favorable, uniform molecular weight distribution. A particular advantage is that virtually no polyglycol formation occurs in the process of the invention.

The products of the process of the invention are particularly suitable for rendering shaped articles antistatic, particularly articles of synthetic polyamides. They are soluble in water, and the rate at which they dissolve may be increased by heating by the addition of solvents. When dissolved in pure water at temperatures between room temperature and 90° C., solutions of the oxyalkylated polyamides are obtained which do not become highly turbid of form a gel on cooling. The aqueous solutions thus obtained are clear and colorless viscous liquids of particular value as textile or dyeing assistants.

In the following Examples the parts and percentages are by weight. The K values stated are determined by the method described by H. Fikentscher in "Cellulosechemie", *13*, 58 (1932).

EXAMPLE 1

160 parts of polycaprolactam having a K value of 67 and a water content of not more than 0.2% and 320 parts of heptane are placed in a pressure vessel. The vessel is flushed with nitrogen and then heated to 100° C. and continuously pressurized with 640 parts of ethylene oxide with stirring. The ethylene oxide feed is adjusted so that a pressure of from 12 to 15 atmospheres gauge is built up within the vessel at a temperature of from 100° to 105° C. The feed of ethylene oxide is complete after from about 10 to 12 hours. Reaction is allowed to continue at the same temperature until the pressure no longer falls. The resulting oxyethylated polycaprolactam suspended in heptane is removed by filtration and dried. There are thus obtained 780 parts of a colorless low-degree oxyalkylated product, which is completely dissolved by water at 50° C.

780 parts of this polyamide are suspended in 780 parts of n-heptane and 8 parts of potassium hydroxide are added. Reaction with 3,500 parts of ethylene oxide is carried out at from 100° to 105° C. in a nitrogen-flushed autoclave of stainless steel at a pressure of from 10 to 12 atmospheres. After a reaction period of 8 hours the pressure in the autoclave begins to fall, and reaction is allowed to continue until a constant pressure is reached. The contents of the autoclave are cooled and the n-heptane is removed by distillation. There are thus obtained 3,320 parts of a waxy colorless product which has a nitrogen content of 0.5% and which is readily soluble in water.

EXAMPLE 2

If Example 1 is repeated except that the polycaprolactam is replaced by 160 parts of polyhexamethyleneadipamide having a K value of 65, there are obtained 3,150 parts of a colorless highly oxyalkylated polyamide of a waxy nature and having a nitrogen content of 0.55%. This product is readily soluble in water.

I claim:

1. The water-soluble, highly oxyethylated, synthetic polyamide containing chemically combined ethylene oxide in an amount of at least 10 times the weight of the polyamide portion, said oxyethylated polyamide being obtained by reacting
   (A) a low-degree oxyethylated polyamide, which contains at least 50% by weight of combined ethylene oxide, and which has been prepared by reacting a synthetic linear polyamide having recurring —CO—NH— groups in the backbone with from 2.5 to 10 times its weight of ethylene oxide in the presence of at least one inert liquid solvent selected from the class consisting of aliphatic and cycloaliphatic hydrocarbons, said solvent being inert under the reaction conditions and having no solvent or swelling action on the polyamide or on the oxyethylated polyamide product, at a temperature of from 60° to 150° C. and at atmosphere or superatmospheric pressure in the absence of any oxyethylation catalyst, with
   (B) at least 10 times its weight of ethylene oxide in the presence of said inert hydrocarbon solvent, at a temperature of from 60° C. to 150° C. and at atmospheric or superatmospheric pressure in the presence of an oxyethylation catalyst.

(References on following page)

References Cited

UNITED STATES PATENTS

| | | | |
|---|---|---|---|
| 2,881,204 | 4/1959 | Kirkpatrick | 260—561 B X |
| 3,609,126 | 9/1971 | Asao et al. | 260—78 |
| 3,645,954 | 2/1972 | Terada et al. | 260—78 Sc X |
| 3,657,386 | 4/7972 | Weedon et al. | 260—78 Sc X |
| 2,835,653 | 5/1958 | Haas et al. | 260—72 N |

FOREIGN PATENTS

| | | | |
|---|---|---|---|
| 794,750 | 2/1936 | France | 260—404.5 |
| 667,744 | 10/1938 | Germany | 260—404.5 |

OTHER REFERENCES

Okazaki et al.: C.A. 72: 56576 w.
Kojima et al.: C.A. 72: 56577 X.

LEWIS GOTTS, Primary Examiner
E. G. LOVE, Assistant Examiner

U.S. Cl. X.R.

260—561 K, 561 B, 78 SC

UNITED STATES PATENT OFFICE
CERTIFICATE OF CORRECTION

PATENT NO. : 3,839,372
DATED : October 1, 1974
INVENTOR(S) : Schneider

It is certified that error appears in the above-identified patent and that said Letters Patent are hereby corrected as shown below:

In the Heading, insert after line 7, --Claims priority, application Germany, June 18, 1970, P 20 30 008.7--

In Column 2, Line 32, delete "polyacprolactam" and substitute --polycaprolactam--

Signed and Sealed this

Twentieth Day of July 1976

[SEAL]

Attest:

RUTH C. MASON
*Attesting Officer*

C. MARSHALL DANN
*Commissioner of Patents and Trademarks*